(12) United States Patent
Nord et al.

(10) Patent No.: US 12,028,902 B2
(45) Date of Patent: Jul. 2, 2024

(54) EARLY-DATA-TRANSMISSION AND RADIO ACCESS NETWORK NOTIFICATION AREA UPDATE

(71) Applicants: Sony Corporation, Tokyo (JP); Sony Mobile Communications Inc., Tokyo (JP)

(72) Inventors: Lars Nord, Lund (SE); Vivek Sharma, Weybridge (GB)

(73) Assignees: SONY MOBILE COMMUNICATIONS INC., Tokyo (JP); SONY CORPORATION, Tokyo (JP)

( * ) Notice: Subject to any disclaimer, the term of this patent is extended or adjusted under 35 U.S.C. 154(b) by 0 days.

(21) Appl. No.: 17/278,319

(22) PCT Filed: Oct. 8, 2019

(86) PCT No.: PCT/EP2019/077212
§ 371 (c)(1),
(2) Date: Mar. 21, 2021

(87) PCT Pub. No.: WO2020/074507
PCT Pub. Date: Apr. 16, 2020

(65) Prior Publication Data
US 2021/0352732 A1    Nov. 11, 2021

(30) Foreign Application Priority Data
Oct. 12, 2018  (SE) .................................. 1830290-1

(51) Int. Cl.
*H04W 74/0833* (2024.01)
*H04W 68/02* (2009.01)
*H04W 76/30* (2018.01)

(52) U.S. Cl.
CPC ....... *H04W 74/0833* (2013.01); *H04W 68/02* (2013.01); *H04W 76/30* (2018.02)

(58) Field of Classification Search
None
See application file for complete search history.

(56) References Cited

U.S. PATENT DOCUMENTS 10,667,185 B2 *   5/2020   da Silva ............ H04W 36/0079
2012/0254890 A1 * 10/2012   Li ............................ H04W 4/70
                                                                719/313
(Continued)

FOREIGN PATENT DOCUMENTS

EP        3804454 A1      4/2021
WO    WO-2017121485 A1 *  7/2017
(Continued)

OTHER PUBLICATIONS

International Search Report and Written Opinion from corresponding International Patent Application No. PCT/EP2019/077212, dated Dec. 6, 2019, 7 pages.

(Continued)

*Primary Examiner* — Jamaal Henson
(74) *Attorney, Agent, or Firm* — Tucker Ellis LLP

(57) ABSTRACT

A method of operating an access node of a radio access network of a cellular network includes participating in an early-data-transmission of a random access procedure of a UE. The method further includes, in response to said participating in the early-data-transmission: determining whether or not the UE requires an update information element of a notification area of the radio access network. The method further includes selectively transmitting the update information element if the UE requires the update information element.

19 Claims, 7 Drawing Sheets

(56) References Cited

U.S. PATENT DOCUMENTS

| | | | |
|---|---|---|---|
| 2017/0034853 A1 | 2/2017 | Rune | |
| 2018/0213452 A1* | 7/2018 | Kim | H04L 5/0091 |
| 2018/0220486 A1 | 8/2018 | Tseng | |
| 2018/0234890 A1* | 8/2018 | Shih | H04W 60/00 |
| 2018/0332561 A1* | 11/2018 | da Silva | H04W 68/02 |
| 2019/0289661 A1* | 9/2019 | Chen | H04W 24/10 |
| 2019/0357272 A1* | 11/2019 | Lim | H04W 74/0841 |
| 2020/0015112 A1* | 1/2020 | Kim | H04W 76/34 |
| 2020/0029262 A1* | 1/2020 | Kim | H04W 74/0833 |
| 2020/0120741 A1* | 4/2020 | Lindheimer | H04W 76/19 |
| 2020/0292262 A1* | 9/2020 | Nakayama | F41A 9/70 |
| 2021/0045162 A1* | 2/2021 | Höglund | H04W 48/10 |
| 2021/0058824 A1* | 2/2021 | Choe | H04W 76/27 |
| 2021/0243721 A1* | 8/2021 | Kim | H04W 68/02 |
| 2021/0360730 A1* | 11/2021 | Kim | H04W 76/28 |

FOREIGN PATENT DOCUMENTS

| | | | |
|---|---|---|---|
| WO | WO-2017194104 A1 | * | 11/2017 |
| WO | WO-2018031395 A1 | | 2/2018 |
| WO | 2018142207 A1 | | 8/2018 |

OTHER PUBLICATIONS

Swedish Office Action with Swedish Search Report from corresponding Swedish Patent Application No. 1830290-1 dated May 17, 2019, 7 pages.

Huawei et al., "Corrections to EDT in 36.331", 3GPP RAN WG2 Meeting #103, R2-1811823, Aug. 20-24, 2018, 48 pages.

Ericsson, "UP solution for early data transmission," 3GPP TSG-RAN WG2 #99bis; R2-1710522, Oct. 9-13, 2017, 5 pages.

3rd Generation Partnership Project, "Technical Specification Group Radio Access Network; Study on New Radio Access Technology; Radio Interface Protocol Aspects (Release 14)," 3GPP TR 38.804 V14.0.0, Mar. 2017, 57 pages.

Japanese Office Action dated May 27, 2022 for Application Serial No. 2021-517852 (7 pages).

Japanese Search Report dated May 27, 2022 for Application Serial No. 2021-517852 (23 pages).

* cited by examiner

EARLY-DATA-TRANSMISSION AND RADIO ACCESS NETWORK NOTIFICATION AREA UPDATE

TECHNICAL FIELD

Various examples of the invention generally relate to communication in a cellular network. Various examples of the invention specifically relate to early-data-transmission of a random access procedure and terminal mobility.

BACKGROUND

Mobile communication employing terminals (also referred to as user equipment, UE) connectable to a cellular network is widespread. There is a constant need for implementing the mobile communication in an efficient manner, e.g., with respect to power consumption at the UE and/or with respect to signaling load imposed on the radio spectrum.

One approach for implementing the mobile communication in an efficient manner includes operating a UE in a mode in which its receiver and transmitter can be shut down at least partly over an extended duration of time. Here, a connection between the UE and a base station—implementing an access node of a radio access network (RAN) of the cellular network—can be temporarily disconnected or suspended or deactivated. All such modes in which the connection between the UE and the RAN is temporarily disconnected or suspended or deactivated are hereinafter referred to as examples of a general sleep mode. An example of a sleep mode would be the "RRC_Inactive" mode specified by the Third Generation Partnership Project (3GPP) for the 5G (New Radio, NR) system. See, e.g.: 3GPP Technical Report (TR) 38.804 V14.0.0 (2017-03), FIG. 5.5.2-1. The RRC_Inactive mode is particularly suitable for UEs that have frequent communication, since it minimizes the signaling load in the network.

To track the mobility of the UE when operating in the sleep mode, paging can be relied upon. For example, a paging message can be transmitted to the UE in multiple cells. The multiple cells may be defined within a paging area. There are various implementations of a paging area known. For example the paging area can be managed by the RAN in which case the paging area is typically referred to as RAN notification area (RNA). Alternatively or additionally, the paging area may also be defined within the core network in which case it is typically referred to as tracking area (TA). Typically, the selection between using a RNA or a TA depends on the particular sleep mode employed.

It has been observed that various reference implementations relying on operating the UE in the sleep mode can suffer certain limitations and drawbacks with respect to the mobility management. For example, it has been observed that sometimes it can be difficult to transmit data to or from the UE and, at the same time, implement mobility management, e.g., by providing an update of the paging area.

SUMMARY

A need exists for advanced techniques of facilitating coexistence between low-latency and/or power efficient data transmission and mobility management for scenarios in which a UE is operated in a sleep mode. Specifically, a need exists for advanced techniques which overcome or mitigate at least some of the above-identified restrictions and drawbacks.

This need is met by the features of the independent claims. The features of the dependent claims define embodiments.

A method of operating an access node of a radio access network of a cellular network includes participating in an early-data-transmission of a random access procedure of a UE. The method further includes, in response to said participating in the early-data-transmission: determining whether or not the UE requires an update information element of a notification area of the radio access network. The method further includes selectively transmitting the update information element if the UE requires the update information element.

A computer program and/or a computer program product and/or a computer-readable storage medium include program code that can be executed by at least one processor. Executing the program code causes the at least one processor to perform a method of operating an access node of a radio access network of a cellular network. The method includes participating in an early-data-transmission of a random access procedure of a UE. The method further includes, in response to said participating in the early-data-transmission: determining whether or not the UE requires an update information element of a notification area of the radio access network. The method further includes selectively transmitting the update information element if the UE requires the update information element.

An access node of a radio access network of a cellular network is configured to participate in an early-data-transmission of a random access procedure of a UE. The access node is also configured to, in response to said participating in the early-data-transmission, determine whether or not the UE requires an update information element of a notification area of the radio access network. The radio access node is further configured to selectively transmit the update information element if the UE requires the update information element.

A method of operating a UE connectable to a radio access network of a cellular network comprises, in response to a need for early data of an early-data-transmission of a random access procedure to be communicated: determining whether an update information element of an notification area of the radio access network is required. The method further comprises, depending on whether the update information element of the notification area is required: including at least one indicator in at least one uplink message of the random access procedure. The at least one indicator is indicative of the early data of the early-data-transmission to be communicated and further indicative of the update information element being required. The method further comprises transmitting the at least one uplink message and participating in the early-data-transmission.

A computer program and/or a computer program product and/or a computer-readable storage medium include program code that can be executed by at least one processor. Executing the program code causes the at least one processor to perform a method of operating a UE connectable to a radio access network of a cellular network. The method comprises, in response to a need for early data of an early-data-transmission of a random access procedure to be communicated: determining whether an update information element of an notification area of the radio access network is required. The method further comprises, depending on whether the update information element of the notification area is required: including at least one indicator in at least one uplink message of the random access procedure, the at least one indicator being indicative of the early data of the early-data-transmission to be communicated and further indicative of the update information element being required. The method further comprises transmitting the at least one uplink message and participating in the early-data-transmission.

A UE connectable to a radio access network of a cellular network is configured to, in response to a need for early data of an early-data-transmission of a random access procedure to be communicated, determine whether an update information element of an notification area of the radio access network is required. The UE is further configured to, depending on whether the update information element of the notification area is required, include at least one indicator in at least one uplink message of the random access procedure, the at least one indicator being indicative of the early data of the early-data-transmission to be communicated and further indicative of the update information element being required. The UE is further configured to transmit the at least one uplink message and participate in the early-data-transmission.

A method of operating a UE connectable to a radio access network of a cellular network comprises, in response to a need for early data of an early-data-transmission of a random access procedure to be communicated: determining whether an update information element of an notification area of the radio access network is required. The method also includes, depending on whether the update information element of the notification area is required: transmitting an uplink message of the random access procedure, the uplink message including a cause for the random access procedure (600), at least one value of the cause selected from a plurality of predefined candidate values being indicative of early data of the early-data-transmission to be communicated and the update information element being required.

A method of operating a UE connectable to a radio access network of a cellular network comprises, in response to a need for early data of an early-data-transmission of a random access procedure to be communicated: determining whether an update information element of an notification area of the radio access network is required. The method also includes, depending on whether the update information element of the notification area is required: transmitting an uplink message of the random access procedure, the uplink message including a cause for the random access procedure, at least one value of the cause selected from a plurality of predefined candidate values being indicative of the update information element being required. A random access preamble of the radio access procedure can be selected from within a predefined partition associated with the early-data-transmission.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
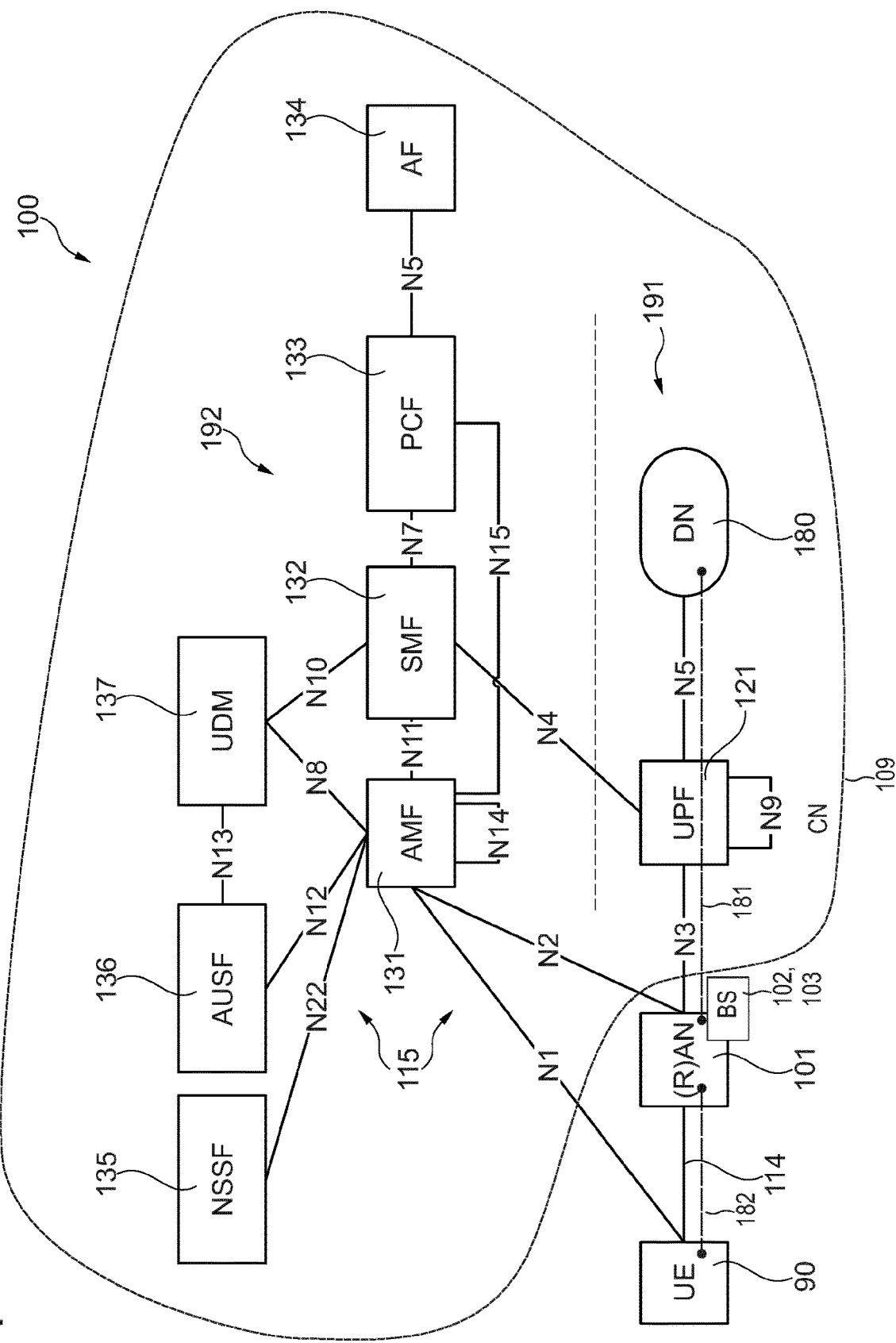
FIG. 1 schematically illustrates a cellular network according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

The techniques described herein may facilitate transmitting and/or receiving (communicating) data between a UE and a base station (BS) of a network. For example, downlink (DL) data and/or uplink (UL) data may be communicated. For example, payload data that may be associated with a service executed at the UE and/or the network may be communicated. For example, payload data may be communicated between the UE and a packet data network (PDN) to which the network providing access to the UE is connected. Payload data is typically defined on a higher layer, e.g., Layer 3 or higher, e.g., Layer 7 of a transmission protocol stack. Payload data is sometimes referred to as user data or application data.

For example, the network may be a cellular network. Example network architectures include the 3GPP LTE (4G) or New Radio (5G) architecture. A cellular network includes multiple cells, each cell being associated with one or more BS, as part of a Radio Access Network (RAN) of the cellular network. The cellular network also includes a core network (CN).

The techniques described herein may be employed in connection with IOT devices. Specifically, the techniques described herein may be employed in connection with Third Generation Partnership Project (3GPP) Machine Type Communication (MTC) devices. The techniques described herein may be employed in connection with 3GPP narrowband IOT (NB-IOT) devices.

Hereinafter, techniques related to a random access (RA) procedure of a UE connecting to a network are described. The UE and the RAN communicate using a RAN connection. The RAN connection is set up between the UE and the RAN using the RA procedure. Hence, the RA procedure may be triggered when the UE is in a sleep mode, e.g., RRC_Inactive for 3GPP 5G.

Triggers for performing the RA procedure may include UL data scheduled or queued for transmission (sometimes referred to as a scenario relating to mobile-originating data, MO data) and/or receipt of a DL paging message, e.g., due to DL data scheduled for transmission.

Typically, the RA procedure includes multiple messages, e.g., four messages; RA message 1 in UL direction (RAmsg1), RA message 2 (RAmsg2) in DL direction, RA message 3 (RAmsg3) in UL direction and RA message 4 (RAmsg4) in DL direction. Details of such a RA procedure in the 3GPP Long Term Evolution (LTE) framework are described in 3GPP Technical Specifications (TSs) 36.211, 36.231, 36.321, and 36.331.

For example, the 3GPP LTE and NR protocols employ a RA procedure including four messages exchanged between the UE and the BS (4-step RA procedure). However, the techniques described herein are not limited to a 4-step RA procedure. Other initial access procedures are also applicable, including but not limited to UE initiated access procedures with more or less number of signaling steps.

The RAmsg1 includes a RA preamble. The RA preamble as used herein may be a pattern or signature. The value of the RA preamble may facilitate distinguishing between different UEs. The RA preamble may be selected from a pool of candidate preambles, e.g., 64 or 128 candidate preambles. The different candidate preambles may use orthogonal codes. For example, a Zaddoff-Chu sequence may be used for generating the RA preamble. The Zaddoff-Chu sequence may form a base sequence or root sequence. Different cyclic shifts may then be applied to obtain the specific RA preamble. Different UEs may use different cyclic shifts. Code division duplexing is possible. RA preamble partitioning may refer to a scenario where a specific partition of the overall pool of available preambles (e.g., defined by the set of all Zaddoff-Chu sequences of a given length) is reserved for a certain purpose. Then, the appropriate selection of a RA preamble can serve as an indicator to the BS.

In connection with the RA procedure, early-data-transmission (EDT) for Rel-15 eMTC and NB-IoT has been discussed. With EDT, the UE can reduce the amount of signaling for small data transmissions by including UL payload data into the RAmsg3. The UL payload for EDT may be included in a control message, e.g., a Radio Resource Control (RRC) message. The control message can be communicated using a control part of the RAN connection, e.g., the so-called Signalling Radio Bearer (SRB). Alternatively or additionally, the network can transmit DL payload data in the RAmsg4 (also part of a RRC message, using SRB). EDT is particularly useful for Internet-of-Things (IoT) devices with small data UL transmissions. Details of EDT are described in 3GPP TS 36.331 V15.3.0 (2018-09), clause 5.3.3.

At a point in time at which the RAmsg3 is transmitted from the UE to the network or BS, there is no RAN connection for payload data set up between the UE and the RAN, i.e., the RAN connection is not pre-established. Hence, EDT is a method to transmit payload data, even before the RAN connection has been (fully) configured.

A situation can occur where UE mobility occurs while the UE is in the sleep mode. To facilitate reachability of the UE, a paging area may be employed. For example, a RNA or a TA may be employed. The UE can be paged throughout the respective cells of the paging area.

An update of the paging area may sometimes be required. For instance, sometimes the UE may have moved so-far that it left or almost left the paging area. Then, it may be desirable to move the paging area along with the movement of the UE.

Hereinafter, various techniques are described which facilitate coexistence of low-latency paging area updates and EDT. Various examples relate to combinations of EDT, a sleep mode, and DRX cycles. Specifically, techniques are described which can facilitate an update of the paging area along with EDT in a RA procedure.

For sake of simplicity, these techniques are described hereinafter with respect to an implementation of the paging area as a RNA. Similarly, for sake of simplicity, the sleep mode is described using the RRC_Inactive mode. Similar examples may also be employed for other kinds and types of paging areas and sleep modes.

When combining RRC_Inactive with EDT, UE mobility occurring during a sleep period may need to be addressed—specifically in a scenario where the UE wakes up to send early data using EDT. This finding is explained using the following example:

(1) A UE that has frequent traffic pattern is configured to use RRC_Inactive. (2) When the UE is in RRC_Inactive, then the RAN is responsible of the reachability of the UE. For this, RAN defines and configures the UE with the RNA. The UE needs to send an indicator indicative of requiring an update information element for the RNA if the UE moves out of the RNA. Then, the UE receives a new RNA configuration, i.e., the update information element. This procedure is called RNA update (RNA-U). See 3GPP TS 38.300 V15.2.0 (2018-06): section 9.2.2.5. (3) Some UEs, e.g., IoT devices in sleep mode, do not constantly monitor the mobility and cells. Such a UE would typically wakeup just before a need for transmitting UL data (e.g., according to a scheduling plan upon a trigger from upper layers, e.g., application layer, for mobile-originating data) and detect that it is in a new cell outside the RNA. This triggers the RNA-U due to mobility. (4) The UE can determine that the UL data can be handled as part of an EDT; hence the UL data can be transmitted as early data of the EDT during the RA procedure for resuming the RAN connection.

Hereinafter, various techniques address the combination of (i) resuming the RAN connection by triggering an RA procedure when in RRC_inactive, (ii) EDT during the RA procedure, and (iii) RNA-U.

For example, in reference implementations, the UE would perform the RA procedure including EDT using a dedicated preamble from a respective preamble partition reserved for EDT (EDT partition) and with RAmsg3 having a cause value indicative of early UL data, i.e., Mobile Originating data (MO-data) or indicative of early DL data, i.e., Mobile Terminating data or control data (MT-access). In this reference implementation, the BS then would not have knowledge that the UE is in a new RNA, since the RNA can be configured individually for each UE based on its mobility pattern. This means that the new BS would be unaware that it should transmit the update information element of the RNA-U. To mitigate this issue, according to reference implementations, the UE would first need to resume the RAN connection to perform the RNA-U and then later send the UL data in a normal UL packet using the re-established RAN connection. This reference implementation essentially would correspond to first performing RNA-U and second transmitting the UL data. In such a reference implementation, the latency of transmitting the UL data would be increased. Also, the control signaling overhead would be increased in this reference implementation. All this would increase the power consumption at the UE. As such, such a reference implementation would be highly inefficient.

To mitigate such drawbacks of this reference implementations, various examples described herein facilitate implementing the RNA-U and the EDT at least partly in parallel. UE-RAN signaling load and UE power consumption can thereby be reduced.

Various examples are based on techniques which facilitate determining, at the BS, whether the UE requires the update information element of the RNA-U or not. Then, if the RNA-U is required, the BS or another node may determine a new configuration of the RNA and then transmit the update information element to the UE.

There are various options available to implement such techniques.

In a first example, a new combined RRC_Resume cause value is created that is indicative of the combined cause for the RA procedure relating to early data to be communicated, e.g., MO-data, and the RNA-U. In other words, there is at least one value of multiple candidate values that is indicative of the combined cause of RNA-U and MO-data of the EDT.

In a second example, the RRC_Resume cause value can be used in conjunction with the RA preamble, to provide an indicator indicative of whether early UL data of the EDT is to be communicated and whether RNA-U is required—or whether only RNA-U is required and there is no early UL data of the EDT to be communicated. For instance, the BS can be informed based on the preamble selected from the EDT partition that early data of the EDT will be included in the RAmsg3; then, the BS can also be informed on the UE requiring the update information element of the RNA-U by considering the cause value of RAmsg3. Here, a given value may be used that is indicative of the UE requiring the update information element. Only if the RA preamble is selected from the EDT partition, this given value may be interpreted as the combined cause of early data of the EDT to be transmitted and RNA-U.

In a third example, the UE can transmit the RAmsg3 with a cause value indicative of early data of the EDT, e.g., MO-data. Then, if the receiving BS is unable locally to find the UE context information, it can perform the UE CONTEXT RETRIEVAL procedure, see e.g. 3GPP TS 38.300 V15.2.0 (2018-06): section 9.2.2.4.1, items 2 and 3. Here, the context information can be determined on an indicator indicative of the UE identity—e.g., the I-RNTI—and an indicator indicative of an anchor BS of the UE. As a result, based on the retrieved UE context information, the BS can determine whether or not the UE requires the update information element of the RNA-U. In this case, the RRC_ConnectionRelease message (RAmsg4) can include the update information element. This example can re-use preexisting cause values of the RAmsg3.

As will be appreciated from the above, in the first and second example described, the UE is configured to transmit at least one indicator—e.g., implemented by the RAmsg3 cause value and/or the RAmsg1 RA preamble partitioning—to the BS, the at least one indicator being indicative of whether the UE requires the update information element of the RNA-U. This may not be required in the third example; here the UE can set the MO-data as cause value in the RAmsg3 and the BS can determine (without additional information from the UE) whether the update information element of the RNA-U is required. For this, the BS may investigate the UE context information.

The various examples described above are associated with certain advantages. For example, the third example may be helpful in scenarios in which the available count of values of the cause for the RA procedure is limited, e.g., due to a limited size of the corresponding information element included in RAmsg3. Then, it may not be required to signal the need for receiving the update information element of the RNA-U; which allows to use the available values for other scenarios. On the other hand, the first and second examples described above can effectively relieve the BS from the need to perform CN signaling. This may help to reduce latency—which can be particularly helpful in scenarios in which the update information element of the RNA-U is to be included in the RAmsg4, to avoid any delay to transmission of the RAmsg 4. In this regard, the second example provided above may be helpful to reduce both latency, as well as efficiency in terms of usage of the available values of the cause of RAmsg3. Here, the value can have a situation-dependent meaning in conjunction with the RA preamble.

As a general rule, in the various examples described, the RNA configuration for the UE can be provided in the RAmsg4, i.e., the update information element of the RNA-U can be included in the RAmsg4.

FIG. 1 schematically illustrates a cellular network 100. The example of FIG. 1 illustrates the network 100 according to the 3GPP 5G architecture. Details of this architecture are described in 3GPP TS 23.501, version 1.3.0 (2017-09). While FIG. 1 and further parts of the following description illustrate techniques in the 3GPP 5G framework of a cellular network, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 90 is connectable to the cellular network 100. For example, the UE 90 may be one of the following: a cellular phone; a smart phone; and IOT device; a MTC device; etc.

The UE 90 is connectable to the network 100 via a RAN 101, typically formed by one or more BSs 102, 103. A wireless link 114 is present between the RAN 101—specifically between one or more of the BSs 102, 103 of the RAN 101—and the UE 90.

The RAN 101 is connected to a core network (CN) 109. The CN 109 includes a user plane (UP) 191 and a control plane (CP) 192. Application data is typically routed via the UP 191. For this, there is provided a UP function (UPF) 121. The UPF 121 may implement router functionality. Application data may pass through one or more UPFs 121, along a CN tunnel 181. In the scenario of FIG. 1, the UPF 121 acts as a gateway towards a data network 180, e.g., the Internet or a Local Area Network. Application data can be communicated between the UE 90 and one or more servers on the data network 180.

The network 100 also includes an Access and Mobility Management Function (AMF) 131; a Session Management Function (SMF) 132; a Policy Control Function (PCF) 133; an Application Function (AF) 134; a Network Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: registration management; Non-Access Stratum termination; connection management; reachability management; mobility management; access authentication; and access authorization. For example, a N2/N3 path switch, triggered by the AMF 131, pertains to a scenario where a UP 121 is configured by the SMF 132 to terminate the UP tunnel 181 at another BS 102, 103 of the RAN—this may be required in case of UE mobility. For example, the AMF 131 controls CN-initiated paging of the UEs 90 if the respective UE 90 operates in RRC_idle mode. In a scenario where the UE 90 operates in RRC inactive, paging is handled by the RAN 101.

A RAN connection 182 may be established between the UE 90 and the RAN 101. For example, the RAN connection 182 may include the SRB and/or a data radio bearer (DRB). The SRB can be mapped to the common control channel of the wireless link 114 during establishment of the RAN connection; upon establishment of the RAN connection, a dedicated control channel of the wireless link 114 may be set-up. For example, RRC control signaling may be implemented on the SRB. The DRB may be used for payload data such as application layer data. This RAN connection 182 is characterized by a UE context information, e.g., defining security parameters, etc. The RAN connection 182 is established if the UE 90 operates in a connected mode, i.e., not in a sleep mode.

To keep track of the current mode of the UE 90, the AMF 131 sets the UE 90 to ECM connected or ECM idle. During ECM connected, a non-access stratum (NAS) connection is maintained between the UE 90 and the AMF 131. The NAS connection implements an example of a mobility control connection. The NAS connection may be set up in response to paging of the UE 90. The AMF 131 assumes that the NAS connection is still established, since the N2 tunnel still remains and that the UE is in ECM Connected even when the UE is in RRC_Inactive.

The SMF 132 provides one or more of the following functionalities: session management including session establishment, modify and release, including tunnel setup of CN tunnels 181 between the RAN 101 and the UPF 121; selection and control of UPFs; configuring of traffic steering; roaming functionality; termination of at least parts of NAS messages related to session management; etc. As such, the AMF 131 and the SMF 132 both implement CP management needed to support a moving UE.

Figure 2:
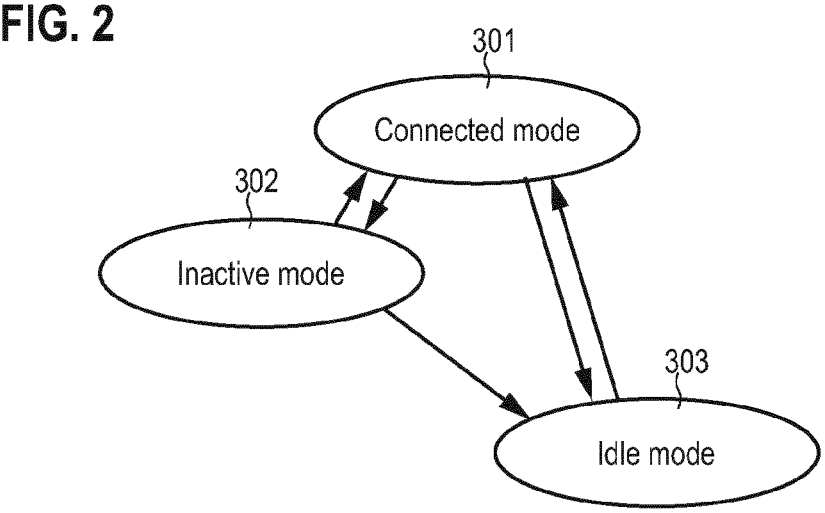
FIG. 2 schematically illustrates various modes in which a UE connectable to the cellular network can operate according to various examples.

FIG. 2 illustrates various modes 301-303 in which the UE 90 can operate according to various examples. The inactive mode 302—e.g., corresponding to RRC_Inactive in the 3GPP 5G scenario—and the idle mode 303—e.g., corresponding to RRC_Idle—are sleep modes.

In the sleep modes 302, 303, there is no possibility for implement transmission of payload data between the RAN 101 and the UE 90, because the RAN connection 182 is not established. Differently, the RAN connection 182 is established in the connected mode 301.

The context information of the UE 90 is maintained while the UE operates in the inactive mode 302, but is not maintained while the UE operates in the idle mode 303. Further, the core network tunnel 181 is maintained while the UE 90 operates in the inactive mode 302; but is not maintained while the UE operates in the idle mode 303. For example, early data of the EDT can be routed via the pre-established core network tunnel 181 when the RA procedure is trigger while the UE 90 operates in the inactive mode 302, e.g., RRC_Inactive.

Figure 3:
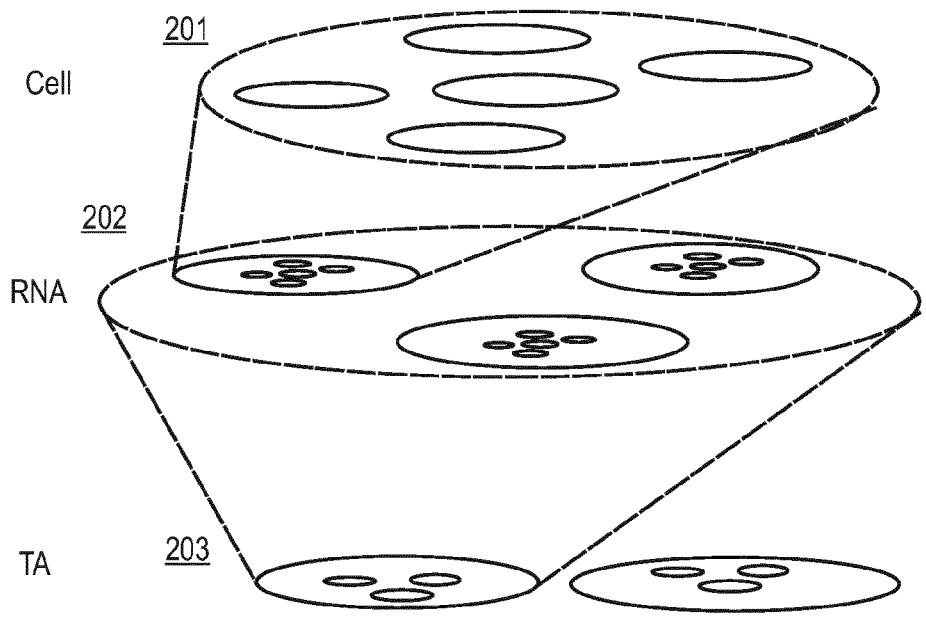
FIG. 3 schematically illustrates cells, RNAs, and TAs of the cellular network according to various examples.

In response to a need for transmitting DL data, the UE 90 may be paged. The paging may be controlled by the AMF 131 if the UE is in the idle mode 303, e.g., in a TA 203 (cf. FIG. 3). Differently, the paging may be controlled by the RAN 101 while the UE is in the inactive mode 302, e.g., in a RNA 202. As illustrated in FIG. 3, each RNA 202 may include multiple cells 201 and each TA 203 may include multiple RNAs 202. It is even possible to configure a RNA 202 with cells 201 that belong to two different TAs 203, i.e., the RNA 202 stretches across the border of two TAs 203.

Figure 4:
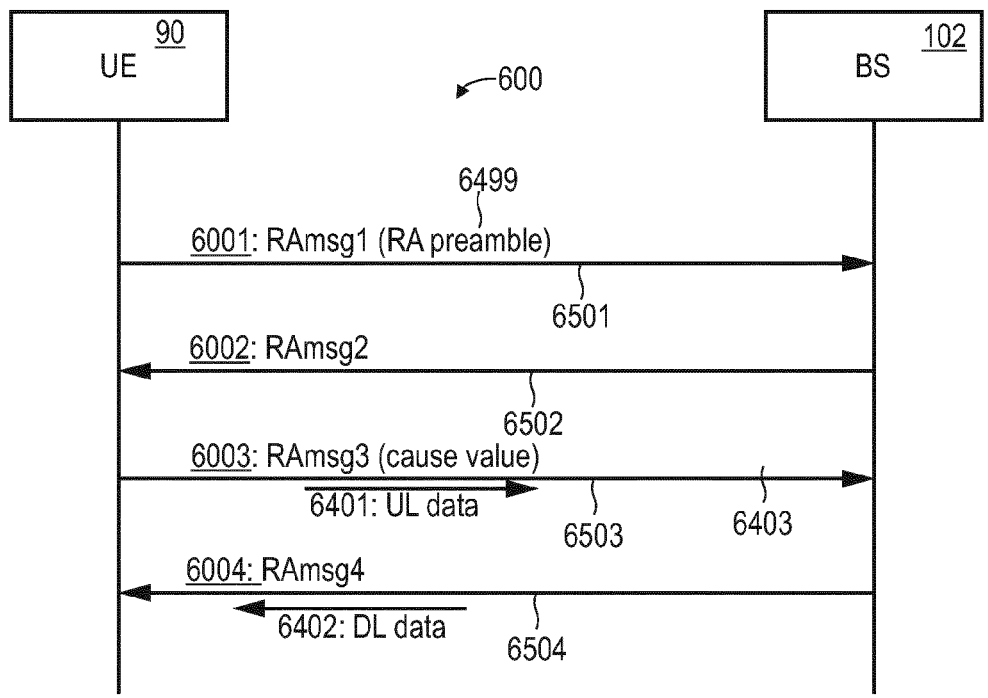
FIG. 4 is a signaling diagram of communication associated with a random access procedure according to various examples.

FIG. 4 schematically illustrates aspects with respect to a RA procedure 600 according to various examples. FIG. 4 is a signaling diagram of communication between the UE 90 and the BS 102.

The UE 90—after being subject to mobility—may detect the BS 102 in its vicinity, e.g., based on broadcasted information or reference signals of the BS 102. Prior to initiating the RA procedure 600, the UE 90 may periodically listen to information blocks broadcasted by one or more BSs of the network. For example, the broadcasted information blocks may include such information as a cell identity of the broadcasting BS. A connection setup attempt from a UE 90 may then be initiated using the RA procedure 600, which may include a non-contention based procedure or a contention based procedure. In typical case, the contention based procedure may start with a four step handshake protocol as shown in FIG. 4.

At 6501, based on the broadcasted information, the UE 90 transmits the RAmsg1 6001 including the RA preamble 6499 to the BS 102, in a respective RAmsg1. The RA preamble may be serve as a temporary identity of the UE 90.

As a general rule, the RA preamble 6499 may be selected from a pool of candidate RA preambles. The pool may be partitioned such that by selecting the RA preamble 6499 from a certain partition, the UE 90 can provide a respective indicator to the BS 102 which is associated with the respective partition. Such a technique is generally referred to as RA partitioning. For instance, there may be a partition reserved for EDT (EDT partition). In the scenario of FIG. 4, the UE 90 may select the RA preamble 6499 from the EDT partition and thereby signal that the RA procedure will use EDT, e.g., for early UL data and/or for early DL data.

In response to transmitting the RA preamble 6499, the UE 90 receives, at 6502, the RAmsg2 6002 including for example a new temporary identity for the UE 90, timing adjustment information, and a scheduling grant for UL resources. The scheduling grant may be addressed to the UE's 90 RA Radio Network Temporary Identity (RA-RNTI).

Using these UL resources, the UE 90 can send, at 6503, a the RAmsg3 6003, or Radio Resource Control (RRC) ConnectionRequest. The RAmsg3 6003 may include a connection establishment cause 6403, i.e., a cause for the RA procedure 600. In case that the UE 90 was in RRC_Inactive mode (inactive mode 302, cf. FIG. 3), the UE 90 would use the RRCConnectionResumeRequest as RAmsg3 which would include the stored I-RNTI, sometime referred to as ResumeID.

In response to the RAmsg3 6003, the UE 90 may receive, at 6504, the RAmsg4 6004, also be referred to as RRC connection request response.

If the connection attempt of the UE 90 to the network 100 is successful, then in some examples, the RAN connection 182 can be established. Then, wireless communication of payload UL data and/or payload DL data along the RAN connection 182 and the CN tunnel 181 can commence.

There are various trigger criteria conceivable for the RA procedure 600. Examples include reception of a network paging message by the UE 90 or reception of a wakeup signal. Further examples include UL payload data scheduled or queued for transmission to the network 100 (MO-data).

In the scenario of FIG. 4, the RA procedure 600 includes an EDT of early UL data 6401 and early DL data 6402, e.g., payload data. As illustrated in FIG. 4, the early UL data 6401 is piggybacked to the RAmsg3 6003, at 6503; and the early DL data 6402 is piggybacked to the RAmsg4 6004. As a general rule, EDT may include communicating at least one of the early UL data 6401 and the early DL data 6402. Details with respect to the EDT are explained in connection with FIG. 5.

Figure 5:
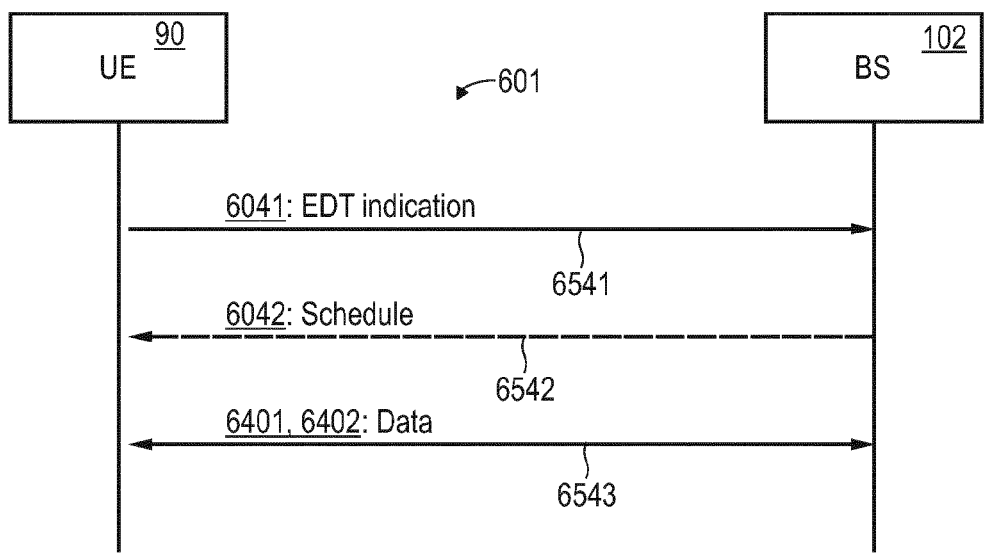
FIG. 5 is a signaling diagram of communication associated with early-data-transmission of the random access procedure according to various examples.

FIG. 5 illustrates aspects with respect to the EDT 601. FIG. 5 is a signaling diagram of communication between the UE 90 and the BS 102. The RA procedure 600 of FIG. 4 and the EDT 601 of FIG. 5 can be combined.

Initially, at 6541, an indicator 6041 indicative of the EDT 601 to take place is communicated. For instance, the indicator 6041 can be implemented by RA preamble partitioning as explained above with respect to FIG. 4, 6501. Optionally, the RAmsg3 6003 may include the cause 6403 for the RA procedure 600 and a value of the cause 6403 selected by the UE 90 may be indicative of the early data 6401, 6402 to be communicated, e.g., early UL data.

Optionally, at 6542, a scheduling grant for UL resources to accommodate for the UL early data 6401 may be received, e.g., as part of the RAmsg2 6002 (cf. FIG. 4).

Then, at 6543, early data 6401, 6402 is communicated between the UE 90 and the BS 102. Again, it is possible that the early data includes UL payload data 6401 and/or includes DL payload data 6402.

Sometimes, e.g., if all data queued for transmission has been successfully communicated using the EDT 601, it is not required to fully set up the RAN connection 182. Then, the RAmsg4 6004 can trigger return of the UE 90 to the RRC_inactive mode 302.

The EDT 601 and the RA 600 can further be combined with RNA-U. Respective concepts are explained in connection with FIG. 6.

Figure 6:
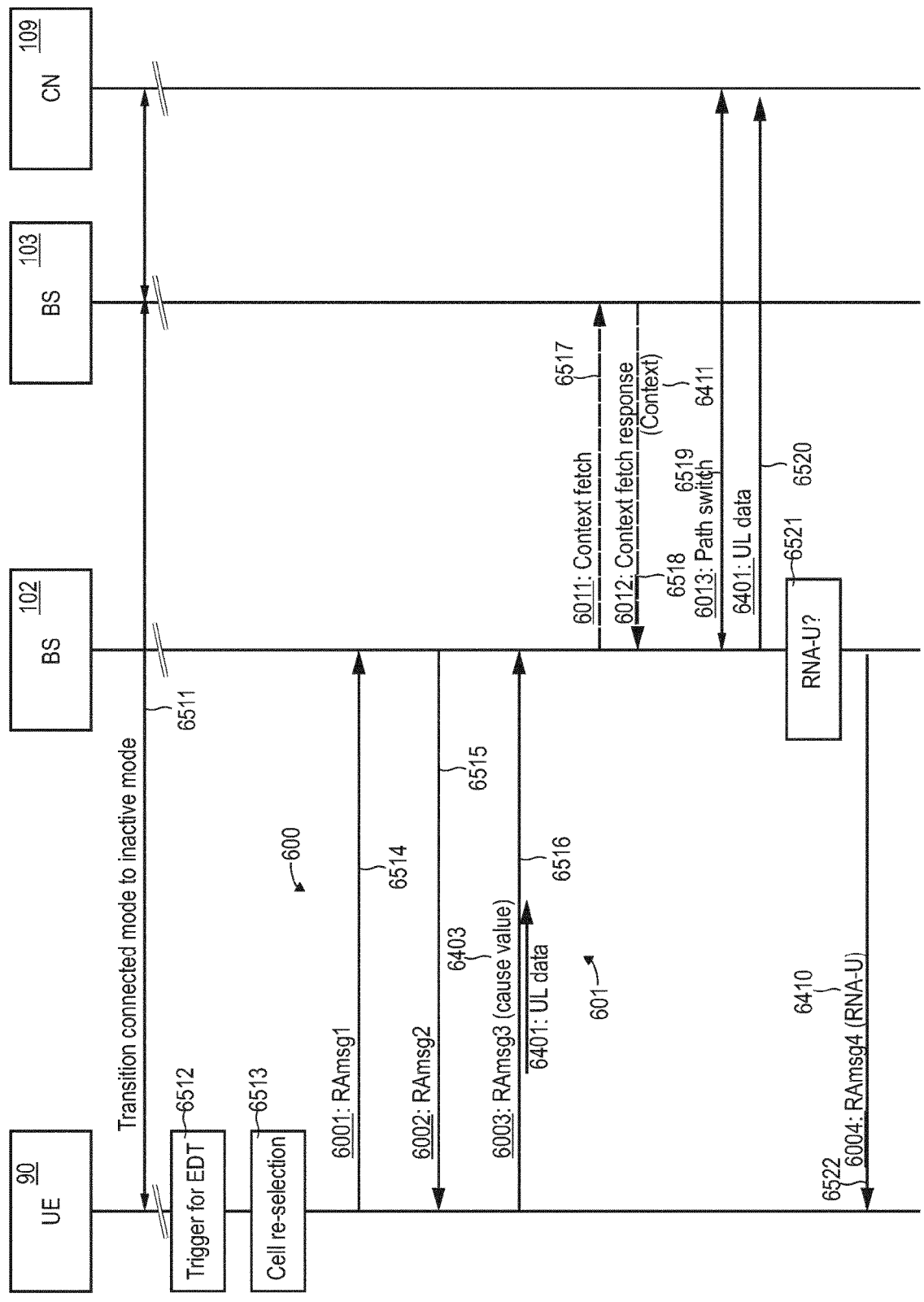
FIG. 6 is a signaling diagram of communication associated with early-data-transmission of the random access procedure according to various examples.

FIG. 6 illustrates aspects with respect to the RA procedure 600 and the EDT 601. FIG. 6 is a signaling diagram of communication between the UE 90, the BSs 102, 103, and one or more nodes of the core network 109, e.g., the AMF 131 and/or the UPF 121. FIG. 6 generally corresponds to the scenarios of FIG. 4 and FIG. 5 and additionally illustrates aspects with respect to mobility of the UE 90 while operating in the RRC_Inactive mode 302.

Initially, at 6511, a transition of operation of the UE 90 in the connected mode 301 to operation of the UE 90 in the inactive mode 302 is performed. This can include communicating a RRC_ConnectionRelease message from the BS 103 (at 6511, the RAN connection 182 is established between the BS 103 and the UE 90; hence the BS 103 is the serving BS) to the UE 90. Also, the RNA 202 of the UE 90 can be determined and a corresponding update information element informing the UE 90 on the configuration of the RNA 202 can be transmitted from the BS 103 to the UE 90 along with a ResumeID (I-RNTI) to be used when resuming the RAN connection at a later stage.

After some time, at 6512, a trigger for the EDT 601 is detected by the UE 90. In-between 6511 and 6512, mobility of the UE 90 has occurred. Hence, the UE 90 has moved out of the coverage area of the previously serving BS 103. Accordingly, at 6513, the UE 90 performs a cell reselection, e.g., based on broadcasted information. Based on this cell reselection, the UE 90 then attempts to reach the BS 102.

Next, the RA procedure 600 including the EDT 601 is performed. Here, 6514 corresponds to 6501; 6515 corresponds to 6502; 6516 corresponds to 6503 (cf. FIG. 4). The BS 102 participates in the EDT 601 by receiving, e.g., the EDT indicator 6041, providing the scheduling information 6042, and/or communicating the early data 6401, 6402 (cf. FIG. 5).

Optionally, at 6517 and 6518, a context fetch procedure is performed. Here, the BS 102 determines that it does not have available the context information 6411 of the UE and, therefore, requests the context information 6411 at the formerly serving BS 103 or, generally, an anchor BS. The BS 103 then responds with the context information 6411. This is based on an identity of the UE 90 and an identity of the BS 102, e.g., derived from I-RNTI.

Next, based on the context information 6411, the BS 102 contacts the core network 109, e.g., the UPF 121 and/or the AMF 131, and requests a N2/N3 path switch. The corresponding procedure 6013 is executed at 6519. Then, the core network tunnel 181 terminates at the BS 102. The UL data 6401 received at 6516, piggybacked to the RAmsg3 6003, can then be routed along the core network tunnel 181, at 6520. It is noted that the core network tunnel 181 is not deactivated or suspended in-between 6511 and 6520; and hence, the UL data 6401 can be transmitted via the pre-established core network tunnel 181. To that end, the UE 90 is listed in the core network as operating in the connected mode 301 (the core network is not aware of the RRC_Inactive mode 302 handled by the RAN 101).

Finally, at 6522, the RAmsg4 6004 is transmitted. Because there is no need to maintain the RAN connection 182—as the queued UL data 6401 has been transmitted using the EDT 601—the RAmsg4 6004 is a connection release message (e.g., RRC_ConnectionRelease message) transmitted by the BS 102 to the UE 90.

In the scenario of FIG. 6, the RAmsg4 includes an update information element 6410 associated with the RNA-U. For this, at 6521, the BS 102 determines whether or not the UE 90 requires the update information element 6410. 6521 is in response to participating in the EDT 601, i.e., executed whenever the BS 102 participates in the EDT 601. Only if the BS 102 determined that the UE 90 requires the update information element 6410, the update information element 6410 is included in the RAmsg4 6004.

As a general rule, there are various options available for determining, at 6521, whether or not the UE 90 requires the update information element 6410. Some of these options are explained below in connection with FIG. 7, FIG. 8, and FIG. 9.

Figure 7:
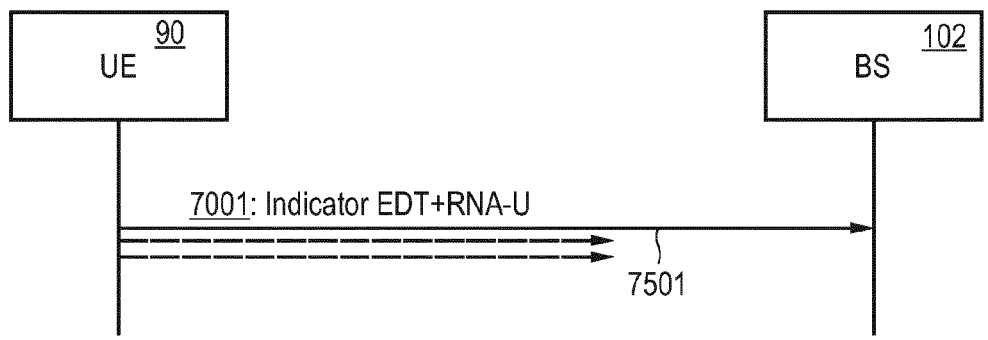
FIG. 7 is a signaling diagram of communication of at least one message including at least one indicator indicative of early data of the early-data-transmission to be communicated and further indicative of an update information element of the RNA being required according to various examples.

FIG. 7 schematically illustrates aspects with respect to determining whether or not the UE 90 requires the update information element 6410. FIG. 7 illustrates a first example with respect to the BS 102 determining whether the update information element 6410 is required.

The UE 90 has determined that it requires the update information element 6410 of the RNA-U (cf. FIG. 6: block 6513). The UE 90 has also determined that there is a need for the EDT 601.

Hence, in the example of FIG. 7, the UE 90 transmits one or more indicators 7001 at 7501. For example, the one or more indicators 7001 can be included in one or more UL messages of the RA procedure 600, e.g., in the RAmsg1 6001 and/or in the RAmsg3 6003.

The one or more indicators 7001 are indicative of the early data 6401, 6402 of the EDT 601 to be communicated, as well as indicative of the update information element 6410 being required. Thereby, the UE 90 can create awareness at the BS 102 of the update information element 6410 being required.

A first possibility of implementing such an indication according to FIG. 7 would be to use the cause 6403 of the RAmsg3 6003. Specifically, the value of the cause 6403 can be selected from a plurality of predefined candidate values such that it is indicative of, both, the early data 6401, 6402 of the EDT 601 to be communicated, as well as of the update information element 6410 being required. In other words, a combined cause value for the RA procedure 600 may be used that signals, to the BS 102, that both EDT 601, as well as RNA-U is being performed in the RA procedure 600. To give a specific example, the plurality of candidate values could be as indicated by Table 1.

TABLE 1

Value of cause in RAmsg3 (e.g., RRCConnectionResumRequest)

| Value of cause in RAmsg3 | Reason(s) for RA procedure |
| --- | --- |
| 1 | emergency |
| 2 | highPriorityAccess |
| 3 | MT-Access |
| 4 | MO -Signalling |
| 5 | MO-Data |
| 6 | delayTolerantAccess-v1020 |
| 7 | MO-VoiceCall |
| 8 | MO-Data and RNA-U |
| 9 | RNA-U |

Here, value "8" of the cause is indicative of the combined reason of MO-data and RNA-U. The value "9" is used to signal RNA-U only, i.e., without MO-Data.

A second possibility of implementing such an indication according to FIG. 7 would be to use the cause 6403 of the RAmsg3 6003, in combination with the RA preamble partitioning of the RA preamble 6499. Here, a value of the cause 6403 can be selected from the plurality of predefined candidate values such that it is indicative of the update information element 6410 of the RNA-U being required. If, in addition, the RA preamble 6499 is selected such that it is within the predefined EDT preamble partition, then again the combined indication of the early data of the EDT 601 and the RNA-U is provided. An example implementation is illustrated in Table 2.

TABLE 2

Value of cause in RAmsg3 (e.g., RRCConnectionResumRequest)

| Value of cause in RAmsg3 | Reason(s) for RA procedure |
| --- | --- |
| 1 | emergency |
| 2 | highPriorityAccess |
| 3 | MT-Access |
| 4 | MO -Signalling |
| 5 | MO-Data |
| 6 | delayTolerantAccess-v1020 |
| 7 | MO-VoiceCall |
| 8 | RNA-U (-If Preamble not within EDT partition: RNA-U only- Else: RNA-U + MO-Data) |

Thus, if the cause value "8" is used, the BS 102 can determine whether the EDT is required (specifically, if the is MO-data) based on, both, the RA preamble in RAmsg1 and the cause value. If compared to the scenario of Table 1, it is not required to provision the cause value "9"—hence, reducing the size of the respective information field.

Figure 8:
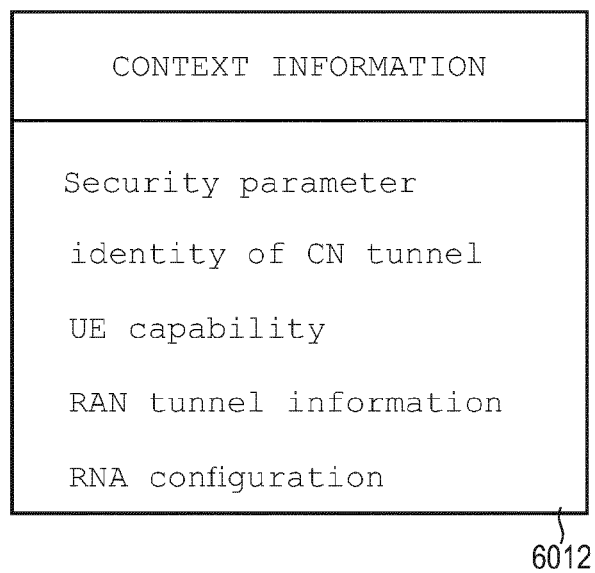
FIG. 8 schematically illustrates context information of the UE according to various examples.

FIG. 8 schematically illustrates aspects with respect to determining whether or not the UE 90 requires the update information element 6410. FIG. 8 illustrates a second example with respect to the BS 102 determining whether the update information element 6410 is required.

In the example of FIG. 8, the UE 90 does not need to transmit one or more indicators that are specifically indicative of the RNA-U (cf. FIG. 7). Rather, the BS 102 can determine whether the UE 90 requires the update information element 6410 based on the UE context information 6012.

For instance, this may involve an inspection of the UE context information 6012. This inspection may be selectively executed if the RAmsg3 6003 includes the cause 6403 having a value indicative of the early data 6401, 6402 to be communicated.

The UE context information 6012, in the illustrated example, includes various information, such as: security parameters for communicating with the UE, an identity of the CN tunnel 181; a capability of the UE 90; and information of re-activating the RAN connection 182 if the UE is in the RRC_Inactive mode 302. Moreover, the UE context 6012 includes information on the previously established configuration of the RNA 202 of the UE 90. This may include a list of all cells 201 that are part of the RNA 202 (cf. FIG. 3). For instance, respective cell identities of the cells 201 may be included or referenced by the context information 6012. The BS 102 can check whether its identity is included in or referenced by the context information 6012; if not, then the update information element 6410 is required.

Figure 9:
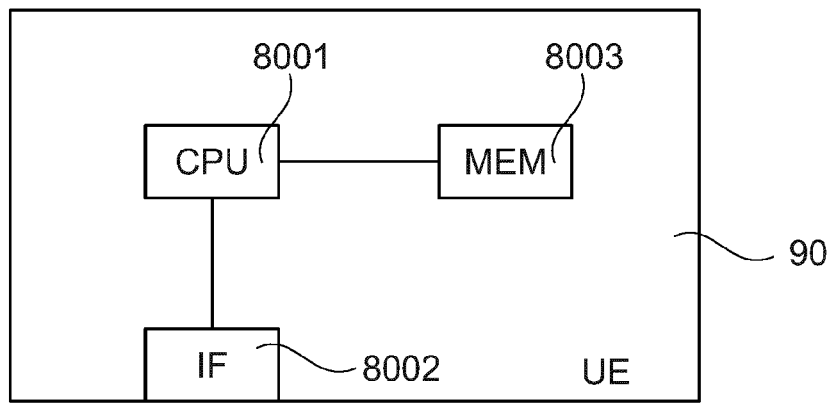
FIG. 9 schematically illustrates a UE according to various examples.

FIG. 9 schematically illustrates the UE 90. The UE 90 includes one or more processors 8001 that are configured to execute program code that can be loaded from a memory 8003. The UE 90 also includes an interface 8002 for communicating with a BS 102, 103 via a wireless link 114. When executing the program code, the one or more processors 8001 can perform techniques as described herein with respect to: participating in an EDT; determining whether an update information element of an RNA-U is required; determining whether UE mobility occurred; participating in an RA procedure; transmitting and/or receiving early data of the EDT; operating in an connected mode or in a sleep mode; receiving a paging message; etc.

Figure 10:
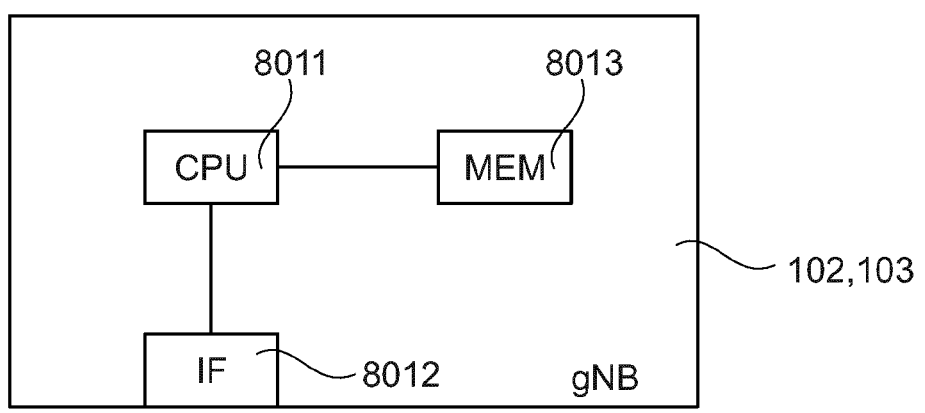
FIG. 10 schematically illustrates a base station according to various examples.

FIG. 10 schematically illustrates a BS 102, 103. The BS 102, 103 includes one or more processors 8011 that are configured to execute program code that can be loaded from a memory 8013. The BS 102, 103 also includes an interface 8012 for communicating with a UE 90 via a wireless link 114. When executing the program code, the one or more processors 8011 can perform techniques as described herein with respect to: participating in an EDT; determining whether an update information element of an RNA-U is required; participating in an RA procedure; transmitting and/or receiving early data of the EDT; tracking whether a UE operates in a connected mode or in a sleep mode; transmitting a paging message; etc.

Figure 11:
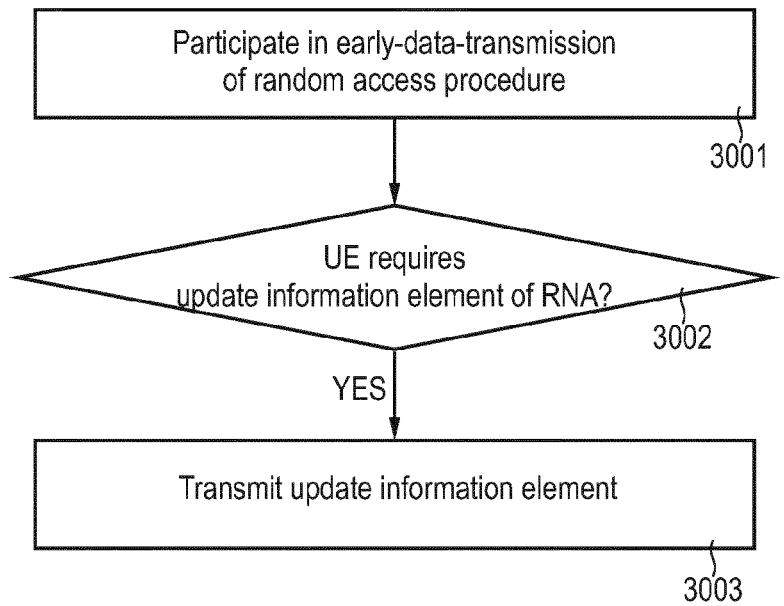
FIG. 11 is a flowchart of a method according to various examples.

FIG. 11 is a flowchart of a method according to various examples. The method of FIG. 11 is executed by a BS. For example, the method of FIG. 11 may be executed by the BS 102. Specifically, it would be possible that the method of FIG. 11 is executed by the one or more processors 8011 of the BS 102 when executing associated program code that is loaded from the memory 8013.

Initially, at block 3001, the BS participates in an EDT of RA procedure. For example, this participating may involve receiving a corresponding indicator from the UE and/or transmitting a scheduling grant to the UE. It may also involve receiving UL data or transmitting DL data to the UE.

In response to participating in the EDT in block 3001, at block 3002, the BS determines whether the UE requires an update information element of an RNA-U. In other words, it may be determined whether UE mobility beyond the previously configured RNA has occurred.

As a general rule, there are various options available for implementing block 3002. For example, one or more messages received from the UE as part of the RA procedure may include one or more indicators that indicate that the UE requires the update information element. Alternatively, it would be possible that the BS determines whether the UE requires the update information element based on context information of the UE. The BS may fetch the context information, if necessary. Such techniques have been described above in connection with FIGS. 7 and 8, respectively.

Next, at block 3003, if it has been determined that the UE requires the update information element, the BS transmits the update information element of the RNA-U. For example, this may involve a reconfiguration of the RNA. For example, the update information element may be included in the RAmsg4 of the RA procedure. This may be particularly helpful where the RAmsg4 deactivates the RAN connection, by transitioning the UE into operation in the inactive mode.

Figure 12:
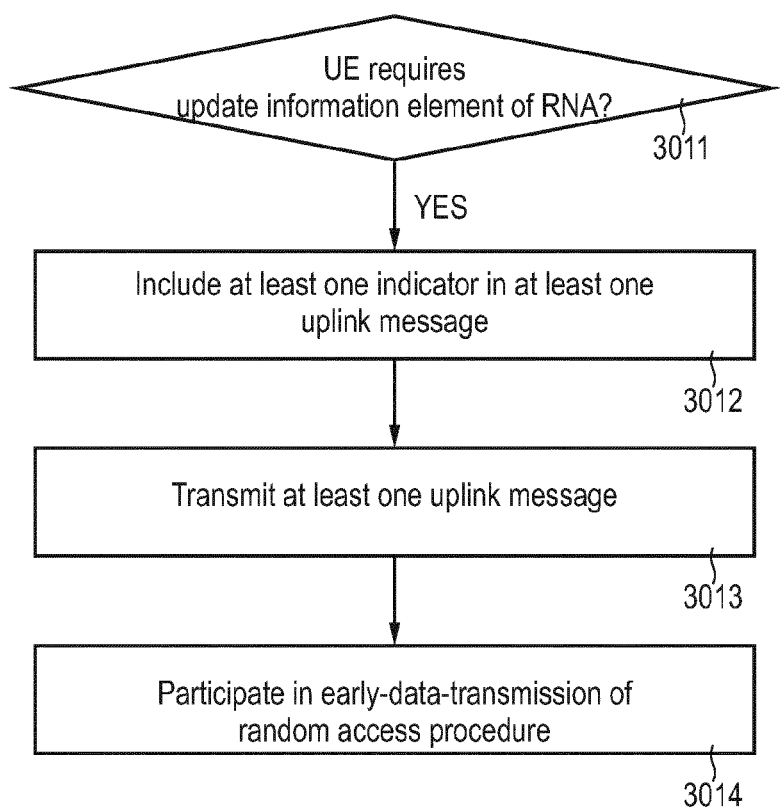
FIG. 12 is a flowchart of a method according to various examples.

FIG. 12 is a flowchart of a method according to various examples. The method of FIG. 12 is implemented by a UE. For example, the method of FIG. 12 may be executed by the UE 90. Specifically, it would be possible that the method of FIG. 12 is executed by the one or more processors 8001 of the UE 90 when executing associated program code that is loaded from the memory 8003.

Initially, at block 3011, the UE determines whether it requires an update information element of an RNA-U. This may involve tracking mobility. For example, the UE may listen for broadcasted cell identities of nearby BSs. Then, the UE can compare the received cell identities with a previous configuration of the RNA.

Block 3011 is triggered by a need for an EDT. For example, the need for the EDT may correspond to UL payload data scheduled in a transmit buffer of the UE. Alternatively or additionally, the need for the EDT may correspond to having received a paging message from the network, because there is DL payload data scheduled for transmission to the UE. For example, a check may be included whether the payload data scheduled for transmission is sufficiently small to be accommodated as EDT. For example, if it is reoccurring prescheduled data, then this check may be dispensed with.

Next, at block 3012—if the UE in fact requires the update information element—the UE includes one or more indicators and one or more message to be transmitted as part of a RA procedure. The one or more indicators are indicative of the early data of the EDT and the UE requiring the update information element of the RNA-U.

Then, at block 3013, the UE transmits the one or more UL messages which include the one or more indicators. Corresponding examples have been discussed above with respect to FIG. 7.

At block 3014, the UE participates in the EDT. Block 3014 generally corresponds to block 3001.

Summarizing, it has been described that a combined indication of MO-data and RNA-U is possible by using one or more indicators. For example, using a single indicator, a combined cause value for MO-data and RNA-U may be included in the RAmsg3. In a further example, it can be specified that in case of using a RA preamble from a partition reserved for EDT (first indicator), it is allowed to use RNA-U as cause value of the RAmsg3 (second indicator). In yet a further example, an EDT cause value can be used, e.g., MO-data or Mobile Terminating (MT)-access. Then, the BS can retrieve the UE context and, based on the UE context, determine whether there is a need for providing a new RNA configuration by transmitting an update information element. Then, the RNA configuration is updated between network nodes and UE is informed with updated RNA configuration in RAmsg4, possibly along with DL data transmitted in response to EDT UL data.

Various techniques are based on the finding that in reference implementations using TAs UE mobility is managed by the CN using a NAS connection to the UE. On the other hand, EDT is an access stratum (AS) even, i.e., defined between the UE and the RAN. Specifically, in reference implementations EDT is defined assuming that the UE is in idle mode, i.e., with a NAS connection released. Thus, RAN-CN signaling is required when the UE transmits early UL data of the EDT. Then, if the UE is in inactive mode the CN may maintain the NAS connection, i.e., from the CN-perspective the UE is connected. As a consequence, both, RNA-U, as well as EDT are AS events from a RAN-perspective; event though UE NAS will trigger the request for EDT.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, various examples have been described with respect to a scenario in which a value of a cause in RAmsg3 is used that is indicative of MO-data and RNA-U in a combined manner. Such a combine cause value may also be implemented for RNA-U and other reasons, e.g., MO-signaling, MT-access, etc.

For further illustration, while various examples have been described in connection with a scenario in which a 3GPP cellular network is used to implement the techniques, similar techniques may also be implemented with non-3GPP networks having multiple access nodes and subject to UE-mobility.

The invention claimed is:

1. A method of operating a first access node of a radio access network (RAN) of a cellular network including the first access node and a second access node, the method comprising:
   participating in an early-data-transmission of a random access (RA) procedure of an associated terminal; and
   in response to the participating in the early-data-transmission:
   receiving an uplink RRCConnectionResumeRequest message of the RA procedure, the uplink RRCConnectionResumeRequest message comprising uplink payload data;
   selectively determining context information of the associated terminal based on the uplink RRCConnectionResumeRequest message including a cause for the RA procedure having a value selected from a plurality of predefined candidate values and being indicative of Mobile Originating data (MO-data) of the early-data-transmission to be communicated, the context information comprising information on a configuration of a previously established connection between the second access node and the associated terminal;

determining based on the selectively determined context information whether the associated terminal requires an update information element of a previously established radio access network notification area (RNA) to include the first access node; and selectively transmitting the update information element to the associated terminal based on determining that the associated terminal requires the update information element.

2. The method of claim 1, wherein:
the RA procedure comprises a 4-step RA procedure; and
the receiving the uplink message of the random access procedure comprises receiving the uplink payload data piggybacked to an RAmsg3 of the 4-step RA procedure.

3. The method of claim 1, further comprising:
receiving in the uplink RRCConnectionResumeRequest message of the random access procedure a cause for the random access procedure, at least one value of the cause selected from a plurality of predefined candidate values being indicative of early data of the early-data-transmission to be communicated and the update information element being required,
wherein the determining whether the associated terminal requires the update information element is based on the cause.

4. The method of claim 1, further comprising:
receiving in the uplink RRCConnectionResumeRequest message of the random access procedure a cause for the random access procedure, at least one value of the cause selected from a plurality of predefined candidate values being indicative of the update information element being required,
wherein the determining whether the associated terminal requires the update information element is based on the cause.

5. The method of claim 4,
wherein the at least one value of the cause is selectively further indicative of early data of the early-data-transmission to be communicated if a random access preamble of the random access procedure is within a predefined preamble partition associated with the early-data-transmission,
wherein the method further comprises:
determining whether the early-data-transmission is required based on the random access preamble and the cause.

6. The method of claim 1, further comprising:
determining whether an identity of the access node is referenced by or included in the context information; and
determining that the associated terminal requires the update information element based on determining that the identity of the access node is not referenced by or included in the context information.

7. The method of claim 1, wherein the associated terminal is listed as operating in a sleep mode in the radio access network and as operating in a suspended or connected mode in a core network of the cellular network.

8. The method of claim 1, further comprising:
routing early data of the early-data-transmission via a pre-established core-network tunnel associated with the associated terminal.

9. The method of claim 1, further comprising:
transmitting a connection release message to the associated terminal,
wherein the update information element is included in the connection release message.

10. The method of claim 1, wherein:
the selectively transmitting the update information element to the associated terminal comprises transmitting the update information element to the associated terminal together with downlink payload data.

11. The method of claim 10, wherein:
the RA procedure comprises a 4-step RA procedure; and
the transmitting the update information element together with the downlink payload data comprises transmitting the downlink payload data piggybacked to an RAmsg4 of the 4-step RA procedure.

12. The method of claim 11, wherein:
the RAmsg4 comprises a message connection release (RRC_ConnectionRelease) message of the 4-step RA procedure.

13. A method of operating a terminal connectable with a radio access network (RAN) of a cellular network, the method comprising:
in response to a need for early data of an early-data-transmission of a random access (RA) procedure to be communicated:
including uplink payload data, a cause for the RA procedure, and an identity of the terminal in an uplink RRCConnectionResumeRequest message of the RA procedure, wherein the cause for the RA procedure comprises a value selected from a plurality of predefined candidate values and being indicative of mobile-originating (MO) data of early-data-transmission to be communicated and wherein the identity is indicative of context information of a previously established connection between the second access node and the terminal, wherein the previously established connection is associated with a previously established radio access network notification area (RNA); and
transmitting the uplink RRCConnectionResumeRequest message while participating in the early-data-transmission of the RA procedure; and
receiving, based on whether the terminal requires an update information element of the previously established RNA to include the first access node, an update information element of the RNA.

14. The method of claim 13, wherein:
the RRCConnectionResumeRequest message of the RA procedure further comprises a random access preamble of the RA procedure being within a predefined preamble partition associated with the early-data-transmission.

15. The method of claim 13, wherein:
the RA procedure comprises a 4-step RA procedure; and
the transmitting the uplink message comprises transmitting the uplink payload data and the indicator piggybacked to an RAmsg3 of the 4-step RA procedure.

16. The method according to claim 13, wherein:
the receiving the update information from the radio access network comprises:
receiving downlink payload data together with the update information from the radio access network.

17. The method according to claim 16, wherein:
the RA procedure comprises a 4-step RA procedure; and
the receiving the downlink payload data comprises receiving the downlink payload data piggybacked to an RAmsg4 of the 4-step RA procedure.

18. The method according to claim 17, wherein:
the RAmsg4 comprises a message connection release (RRC_ConnectionRelease) message of the 4-step RA procedure.

19. An access node operable in a radio access network (RAN) of a cellular network, the access being operable to:
participate in an early-data-transmission of a random access (RA) procedure of an associated terminal; and
in response to the participating in the early-data-transmission:
  receive an uplink RRCConnectionResumeRequest message of the RA procedure, the uplink RRCConnectionResumeRequest message comprising uplink payload data;
  selectively determine context information of the associated terminal based on the uplink RRCConnectionResumeRequest message including a cause for the RA procedure having a value selected from a plurality of predefined candidate values and being indicative of Mobile Originating data (MO-data) of the early-data-transmission to be communicated, the context information comprising information on a configuration of a previously established connection between the second access node and the associated terminal;
  determine based on the selectively determined context information whether the associated terminal requires an update information element of a previously established radio access network notification area (RNA) to include the first access node; and
  selectively transmit the update information element to the associated terminal based on determining that the associated terminal requires the update information element.

* * * * *